United States Patent [19]

Marcus

[11] Patent Number: 4,618,531

[45] Date of Patent: Oct. 21, 1986

[54] POLYESTER FIBERFILL AND PROCESS

[75] Inventor: Ilan Marcus, Versoix, Switzerland

[73] Assignee: E. I. Du Pont de Nemours and Company, Wilmington, Del.

[21] Appl. No.: 734,423

[22] Filed: May 15, 1985

[51] Int. Cl.[4] .................................... B32B 5/16

[52] U.S. Cl. .................................... 428/283; 28/159; 28/162; 428/280; 428/284; 428/287; 428/288; 428/369; 428/375; 428/391; 428/447; 264/15; 264/117; 264/121; 264/503; 264/517

[58] Field of Search .................... 264/15, 503, 517, 117, 264/121; 28/159, 162; 428/283, 284, 280, 287, 288, 375, 369, 375, 391, 447

[56] References Cited

U.S. PATENT DOCUMENTS

| | | | |
|---|---|---|---|
| 3,050,821 | 1/1960 | Kilian | 28/82 |
| 3,118,012 | 3/1962 | Kilian | 264/176 |
| 3,671,379 | 3/1971 | Evans et al. | 161/173 |
| 3,892,909 | 7/1975 | Miller | 428/371 |
| 4,065,599 | 12/1977 | Nishiumi et al. | 428/402 |
| 4,144,294 | 3/1979 | Werthaiser | 264/15 |
| 4,364,996 | 12/1982 | Sugiyama | 428/369 |
| 4,477,515 | 10/1984 | Masuda et al. | 428/288 |
| 4,481,256 | 11/1984 | Masuda et al. | 428/362 |

FOREIGN PATENT DOCUMENTS

| | | |
|---|---|---|
| 56-68108 | 6/1981 | Japan . |
| 2065728 | 7/1981 | United Kingdom . |

*Primary Examiner*—James J. Bell

[57] ABSTRACT

Polyester fiberfill having spiral-crimp that is randomly-arranged and entangled in the form of fiberballs with a minimum of hairs extending from their surface, and having a refluffable characteristic similar to that of down on account of the low cohesion between the balls. A process for making such fiberballs by repeatedly air-tumbling small tufts of such fiberfill against the wall of a vessel.

18 Claims, 7 Drawing Figures

POLYESTER FIBERFILL AND PROCESS

TECHNICAL FIELD

This invention concerns improvements in and relating to polyester fiber filling material, commonly referred to as polyester fiberfill, and more particularly to providing polyester fiberfill in a form that is refluffable.

BACKGROUND OF INVENTION

Polyester fiberfill has become well accepted as an inexpensive material for pillows, other bedding articles, such as quilts and sleeping bags, apparel and furnishing cushions, and is used in large quantities commercially. The fiberfill is generally made from poly(ethylene terephthalate) fibers in staple form, of various cut lengths. Hollow fibers are sometimes used in preference to solid fibers, and use of a silicone slickener has given an improvement in lubricity and aesthetics. However, down and blends of down with feathers are still preferred by some consumers for some purposes because of their aesthetics. Hereinafter, we shall generally refer to down, although it will be understood that blends of down/feathers are often used and preferred in commercial practice. The main practical and aesthetic advantage over prior synthetic materials has been that down is refluffable. This means that a quilt containing compacted down can be returned quickly to its original soft fluffy condition simply by shaking and patting. This remains true for down quilts even after prolonged use (provided the down is not damaged by the effect of water). The pillows, even pure down may compact after prolonged use, so mixtures of down and feathers are generally used in preference. During use, eventually all prior synthetic substitutes develop gross defects, such as matting of the fiberfill, resulting in a very lumpy article, or lesser clumping of the fiberfill, which is noticeable as lack of uniformity and reduction in softness during prolonged use, as contrasted with down. What has been desirable, has been a washable article that can be repeatedly refluffed merely by shaking and patting.

Because of the commercial desirability of providing a washable down-like substitute, considerable research has been devoted to the study of down and feathers and their structures. Attempts have been made to simulate the characteristics and structure of down and of feathers using polyester fiberfill substitutes in such forms as have been referred to variously as flakes, e.g., U.S. Pat. Nos. 4,259,400 and 4,320,166, loops, e.g., GB No. 2,050,818 and pom poms, e.g. U.S. Pat. No. 4,418,103. These included several suggestions for producing substitutes for down by converting polyester fiberfill into spherical bodies.

Miller, U.S. Pat. No. 3,892,909 discloses assemblages of several shapes, including substantially cylindrical or spherical bodies and feathery bodies, of synthetic fibers for simulating down. Miller does not disclose any machines for manufacturing these bodies. Miller's process involves treating a tow or other fiber bundle with a binder, cutting the treated tow to form staple, forming the bodies of the desired shape, and drying to set binder and retain thereby the desired shape of the body. While use of a binder is considered essential by Miller, this necessarily reduces the softness of the product, and so it would be desirable to avoid the need to use binder for this purpose. Nishiumi et al., U.S. Pat. No. 4,065,599 discloses spherical objects composed of fibers of length at least 0.2 m that are similarly fixed on each other at their points of contact, by using an adhesive or a thermoplastic polymer of low melting point. Nishiumi makes each spherical object individually by jetting the fibers into a porous vessel and rotating and shearing the filaments therein by means of eccentric gas streams, and then setting and fixing the filaments. Werthaiser et al., U.S. Pat. No. 4,144,294 discloses a method of changing sheet-like segments of garnetted polyester fibers into rounded bodies. These garnetted sheets have been sprayed with a resin to connect the fibers at their points of contact. The pieces may be agitated, rolled and tumbled to aid in the formation of the rounded bodies. Maruse Kogyo GB No. 2,065,728 does not mention down, but discloses wadding in the form of balls of synethetic fibers, these balls being crimped fluffs and intertwining one another. Maruse's process comprises opening the raw fiber, blowing the opened fiber through circuitous pipes made of insulating material so as to charge the fiber with electricity and thereby form the fiber into balls, and then spraying the balls with a resin binder. Thus, these prior methods involve use of a binder to fix the fibers in their ball-shape. This use of a binder and the resulting lack of freedom of movement of the fibers is not desirable for a down-like substitute, because of the significant reduction in softness that is caused thereby.

We are aware of a competitive offering (referred to as 38K) comprising some small (average dimension about 0.1 m or less) flattened discs mixed with longer cylindrical shapes (referred to herein as tails). The polyester fibers of this product have a spiral-crimp. No binder is present. 38K is an improvement on some forms of loose fiberfill with regard to refluffability, but does not compare well with down because 38K clumps during prolonged use.

Thus, no synthetic product so far has provided a real alternative to down, which has a significant advantage in refluffability. It would be desirable, therefore, to provide a polyester fiberfill with refluffable characteristics (available from down), and also with washability (unlike down) and at a lower cost than down.

SUMMARY OF INVENTION

According to the invention, there are provided refluffable fiberballs of average dimension 1 to 15 mm, at least 50% by weight of the balls preferably having a cross-section such that its maximum dimension is not more than twice its minimum dimension, consisting essentially of randomly-arranged, entangled, spirally-crimped polyester fiberfill having a cut-length of about 10 to about 60 mm, and having a cohesion measurement as defined of less than 6N (Newtons), preferably about 4.5N or less, and especially about 3N or less whereby preferred refluffable products are obtained.

There is also provided, according to the invention, a process for making polyester fiberfill having refluffable characteristics, wherein small tufts of polyester fiberfill having spiral-crimp are repeatedly tumbled by air against the wall of a vessel to provide an assembly of fiberballs having a cohesion value as defined of less than 6N, preferably about 4.5N, or less, and especially about 3N or less.

As discussed hereinafter, there is no objective measurement for refluffability. Refluffability has, therefore, been assessed only subjectively, and a quantitative measurement of cohesion has been devised to indirectly measure refluffability for the fiberballs of the invention.

DETAILED DESCRIPTION OF THE INVENTION

Figure 1:
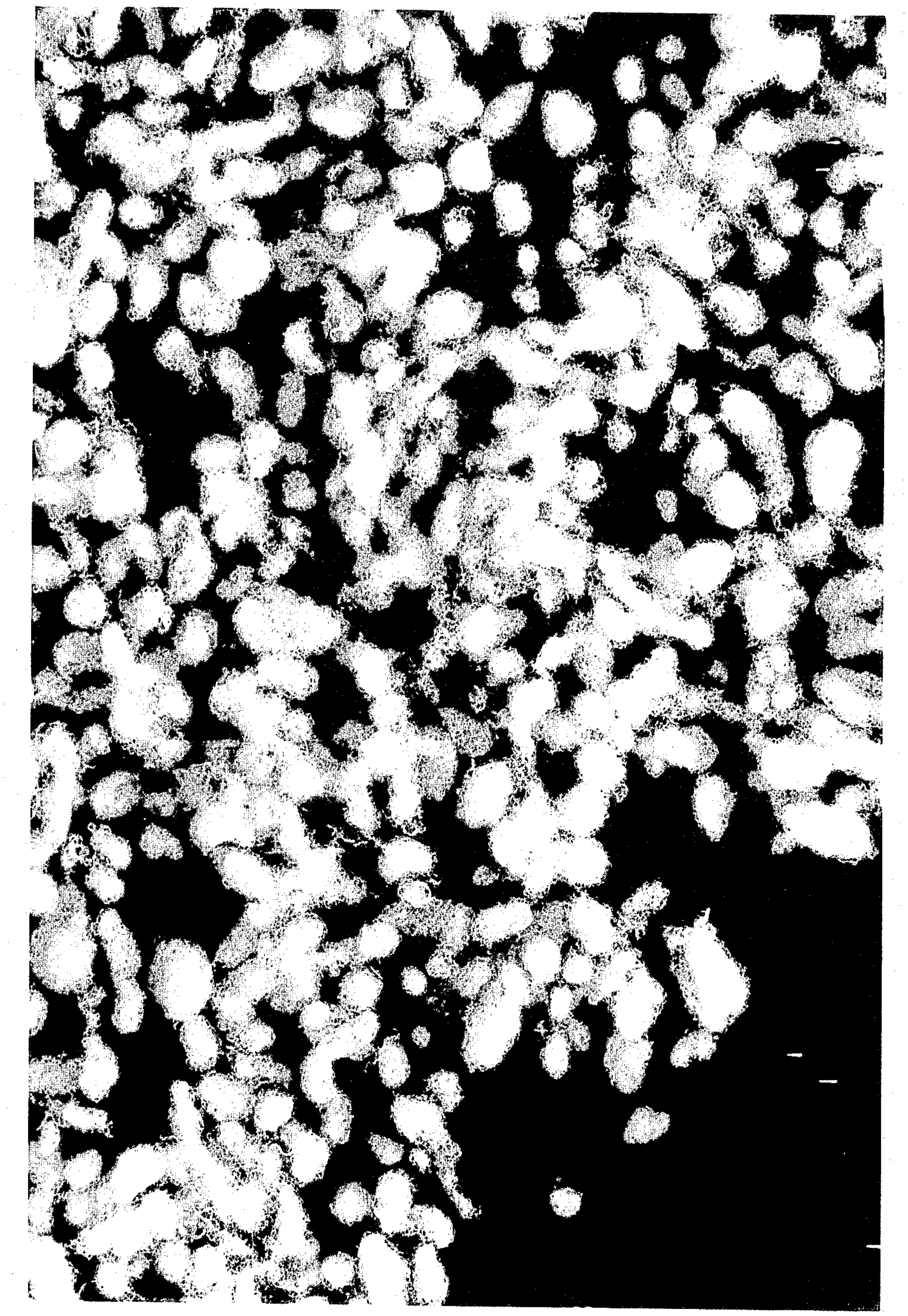
FIG. 1 is a slightly enlarged (1.5×) photograph of the product of the invention.
Figure 2:
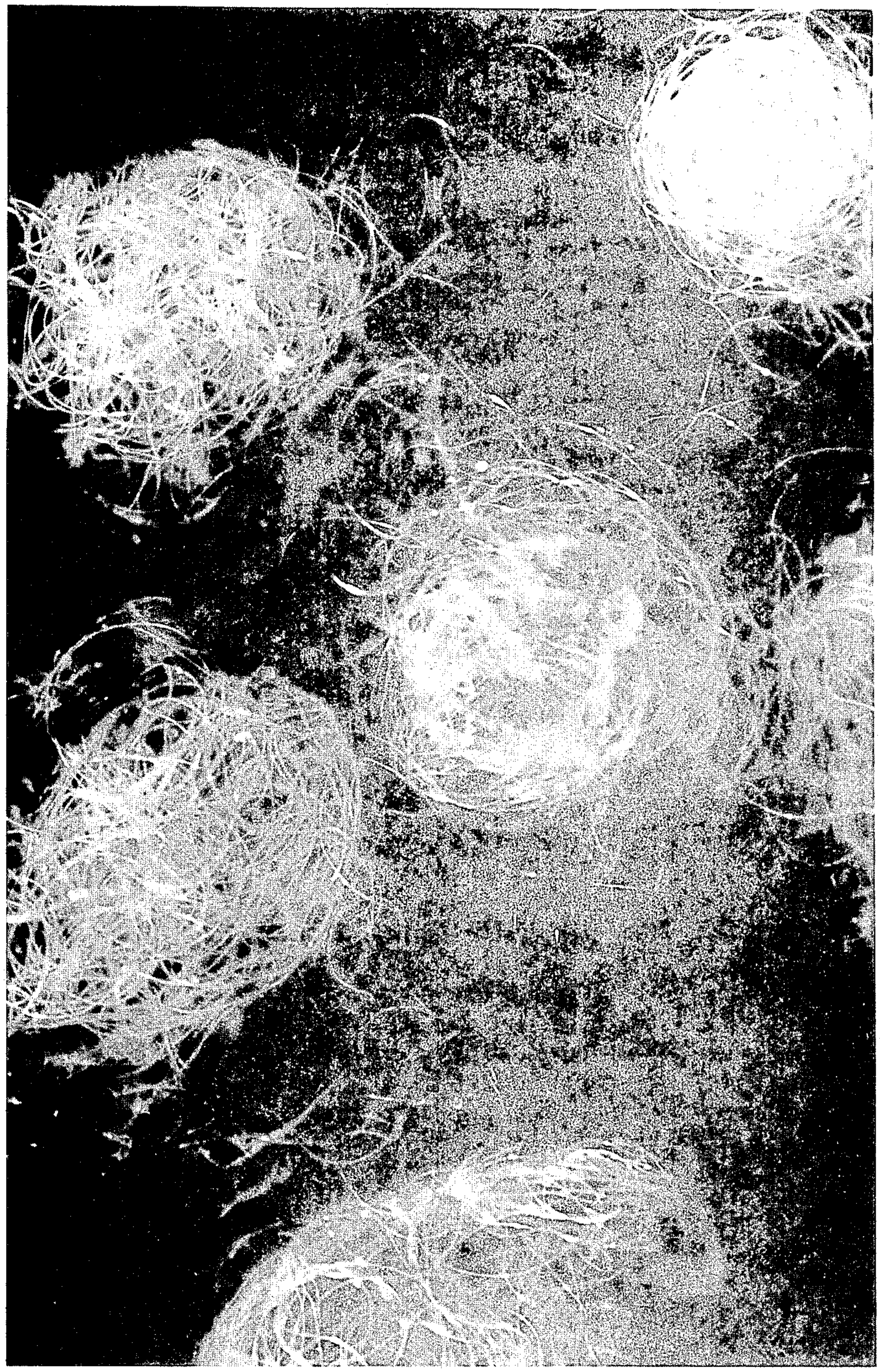
FIG. 2 is a more magnified (21×) photograph of the product of the invention.
Figure 3:
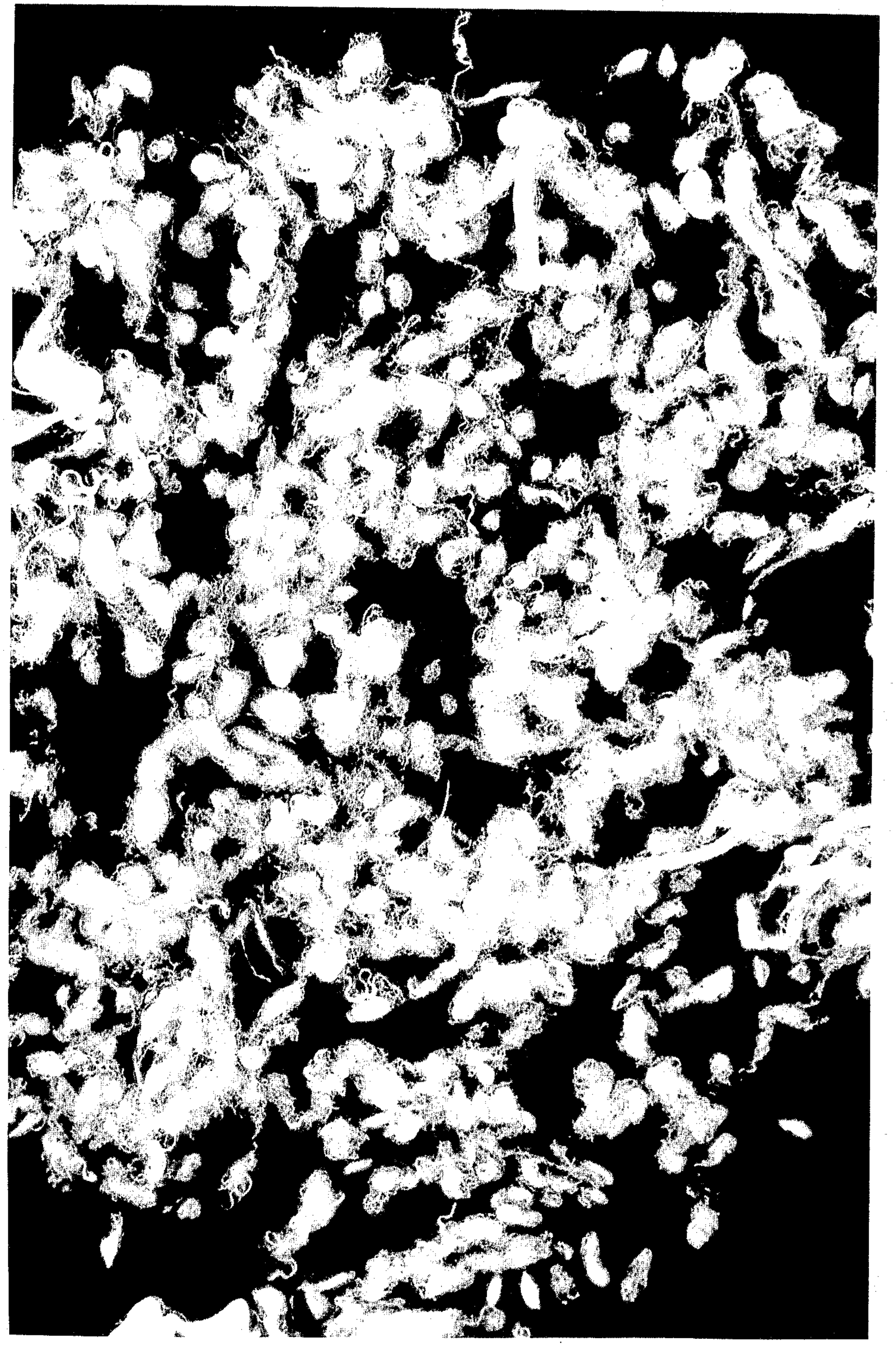
FIG. 3 (Prior Art)
FIG. 3 is a slightly enlarged (1.5×) photograph of the competitive offering 38K.
Figure 4:
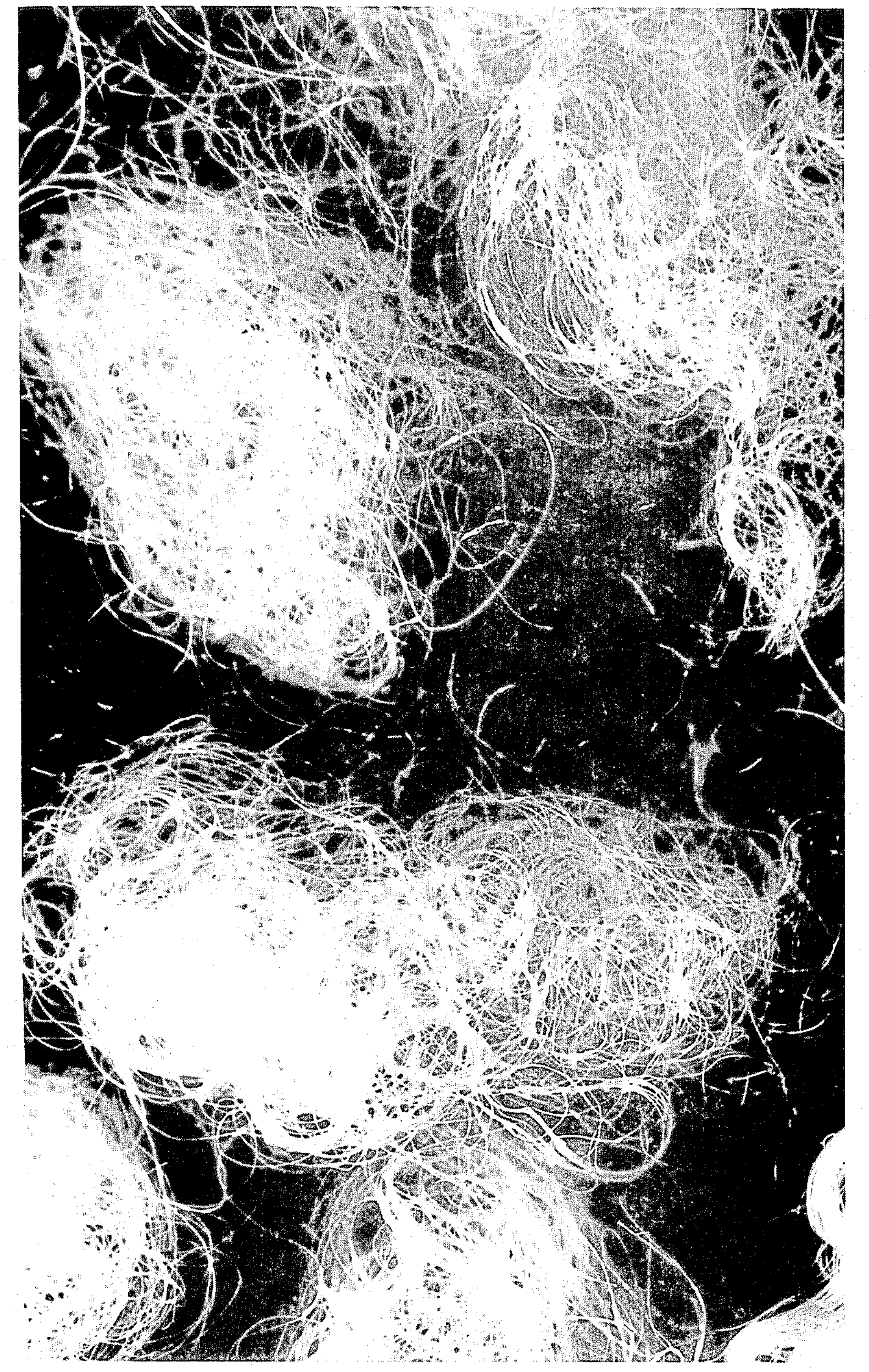
F I G. 4 (Prior Art)
FIG. 4 is a more magnified (23×) photograph of the competitive offering 38K.

The nature of the fiberballs of the invention can be seen in FIGS. 1 and 2 of the accompanying drawings, and can be compared with the FIGS. 3 and 4, according to the prior art, all of these Figures being photographs that have been enlarged, and for which the balls have been somewhat separated from each other, for convenience. In the slightly enlarged (1.5×) photograph (FIG. 1), there are enough balls so that the predominant number of balls, as opposed to tails, can be observed. In the more magnified (21×) photograph (FIG. 2), it can be noted that the balls are not significantly hairy and have a randomized structure, which is, in fact 3-dimensional. This can be seen more clearly by comparing with the photographs at somewhat similar magnifications in FIGS. 3 and 4 of competitive offering 38K. In FIG. 4, there are many more hairs extending from the surfaces of the bodies, and this is partly responsible for the increased cohesion and inferior refluffability of 38K. There is also a significantly greater degree of parallelism of the fibers in 38K, i.e., a less random structure. Although, at first sight, some similarities may be seen between the bodies of spirally-crimped fiberfill in FIGS. 1 and 3, closer inspection confirms that the bodies in FIG. 3 are hairier, and comprise more tails and fewer bodies of round cross-section, both of which features increase cohesion and reduce refluffability. What may not be so easily determined from a 2-dimensional photograph, but can be determined by actual inspection, is that the bodies that look round in FIGS. 3 and 4 are actually flattened discs, and are quite different from the 3-dimensional balls of the invention shown in FIGS. 1 and 2.

The discs of 38K and the fiberballs of the invention both have cross sections of the same general average dimensions, although 38K contains a significant number of longer tails, which is believed to be a serious defect, because it is believed that an average dimension of less than 15 mm is important for aesthetic reasons. Larger balls can generally be distinctly felt, and this is a defect of many prior suggestions.

An essential element of the invention is the use of spirally-crimped fiberfill, i.e. fibers having a 3-dimensional helical crimp. The provision of a spiral crimp is itself well-known for other purposes. This can be provided economically by asymmetric-jet-quenching of freshly-extruded polyester filaments, as taught, e.g. in Kilian U.S. Pat. Nos. 3,050,821 or 3,118,012, especially for filaments of drawn denier in the range about 1 to 10. Asymmetric-jet quenching is the preferred technique, and was used to make the fiberballs in the Examples herein. An alternative way to provide spiral-crimp is to make bicomponent filaments, whereby the components have different shrinkages upon being heat-treated, and so become spirally-crimped. Bicomponents are generally more expensive, but may be preferred for some end-uses, especially if it is desired to use fiberfill of relatively high denier, such as is more difficult to spiral-crimp adequately by an asymmetric-jet-quenching technique. Bicomponent polyester filaments are taught, e.g., in Evans et al. U.S. Pat. No. 3,671,379. Of course, especially with bicomponent filaments, there is no need to use only polyester components. A suitable polyamide/-polyester bicomponent filament can be selected to give a good spiral-crimp.

Apart from the spiral-crimp, which is essential, the fiberfill staple fibers may be solid or hollow, of round cross-section or non-round, and otherwise as disclosed in the prior art, according to the aesthetics desired and according to what materials are available.

The spiral-crimp must be developed in the fiberfill so that making the fiberballs becomes possible. Thus a tow of asymmetrically-jet-quenched polyester filaments is prepared by melt spinning and gathering the spun filaments together. The tow is then drawn, preferably slickened, relaxed and cut conventionally to form staple fibers, and again relaxed after cutting to enhance the asymmetric character of the fibers. This character is required so the fibers will curl and form the desired fiberballs with minimal hairiness. Mechanical crimping, such as by a stuffer-box technique, is not desired because it would destroy the desired spiral-crimp, and so the mechanically-crimped fiberfill would not form fiberballs, as desired. Such mechanical crimping is not an alternative to spiral-crimp, because mechanical crimping gives a 2-dimensional crimp which will not form the desired fiberballs.

Polyester fiberfill, like other staple fiber, has been generally transported in compressed bales, which are conventionally first treated in an opener, so as to separate the individual fibers to some extent before they are further processed, e.g. on a card if a parallelized web is desired. For making products of the invention, it is not necessary, and is generally undesirable, to completely parallelize the fibers, but it is desirable first to open and separate the fibers into discrete tufts before treatment to form the fiberballs, as will be described.

The fiberballs are formed by air-tumbling small tufts of fiberfill (having spiral-crimp) repeatedly against the wall of a vessel so as to densify the bodies and make them rounder. The longer the treatment, generally the denser the resulting balls. It is believed that the repeated impacts of the bodies cause the individual fibers to entangle more and lock together because of the spiral-crimp. In order to provide a refluffable product, however, it is also necessary to reduce the hairiness of the balls, because the spiral-crimp of any protruding fibers will raise the cohesion and reduce the refluffability. This cohesion can also be reduced somewhat, however, by thorough distribution of a slickener, preferably a silicone slickener, e.g. as described in U.S. Pat. No. 3,454,422, to increase lubricity between the fiberballs. Suitable concentrations are generally 0.15 to 0.5%, preferably 0.3 to 0.4%, Si (measured by X-ray fluorescence) on weight of fiber, but this will depend on the materials, and how it is applied. Depending on the aesthetics desired, the amount of tumbling and application of slickener may be adjusted.

The air-tumbling has been satisfactorily performed in a modified machine that has been based on a Lorch machine that is available commercially but needed redesigning and rebuilding for the purposes of the invention.

The original machine was a Lorch loosener/blender M/L7 available from Lorch AG, Esslingen, Germany, normally used for blending feathers with down and/or synthetic fiber. This machine comprises a stationary cylindrical drum of length about 1.3 meters and diameter about 1.1 meter, mounted with its length horizontal. A longitudinal central shaft equipped with plastic stirrer blades rotate at speeds of 250–350 rpm to stir the contents, while air and the materials to be blended are recirculated, being withdrawn through outlets provided in each circular end face, and returned through the cylindrical wall at its longitudinal midpoint. For use in making the fiberballs of the invention, this Lorch M/L7 loosener/blender was modified by being substantially redesigned and rebuilt to enable the shaft to rotate at higher speeds of up to about 1000 rpm with spring steel stirrer blades, so that the machine would withstand the resulting increased stresses, and to eliminate the rough spots, projections and discontinuities that would otherwise snag the fiberfill.

Figure 5:
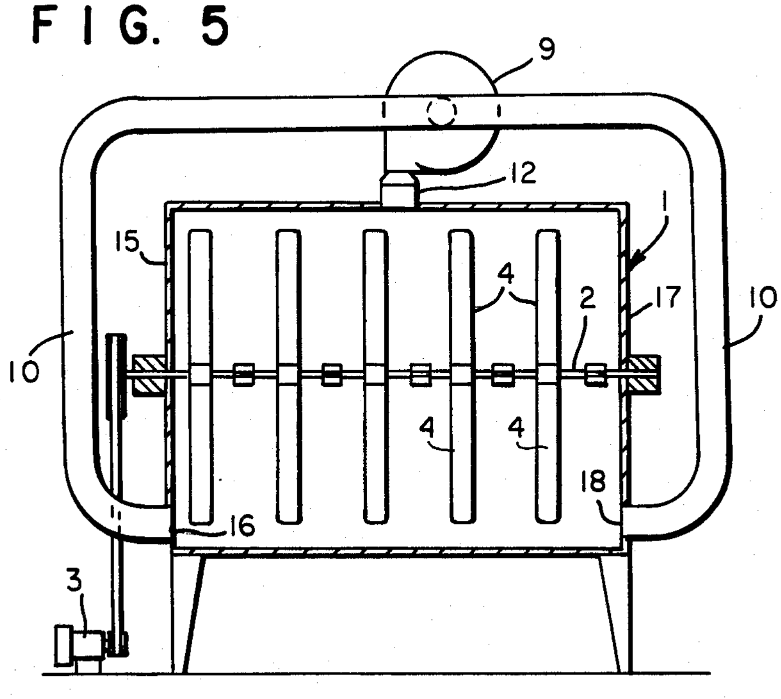
FIGS. 5 & 6 are schematic drawings in section of the machine used to make the product of the invention.
Figure 6:
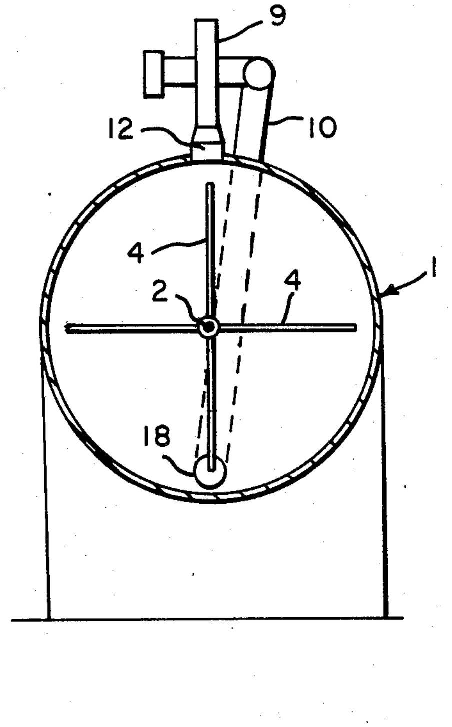
Figure 7:
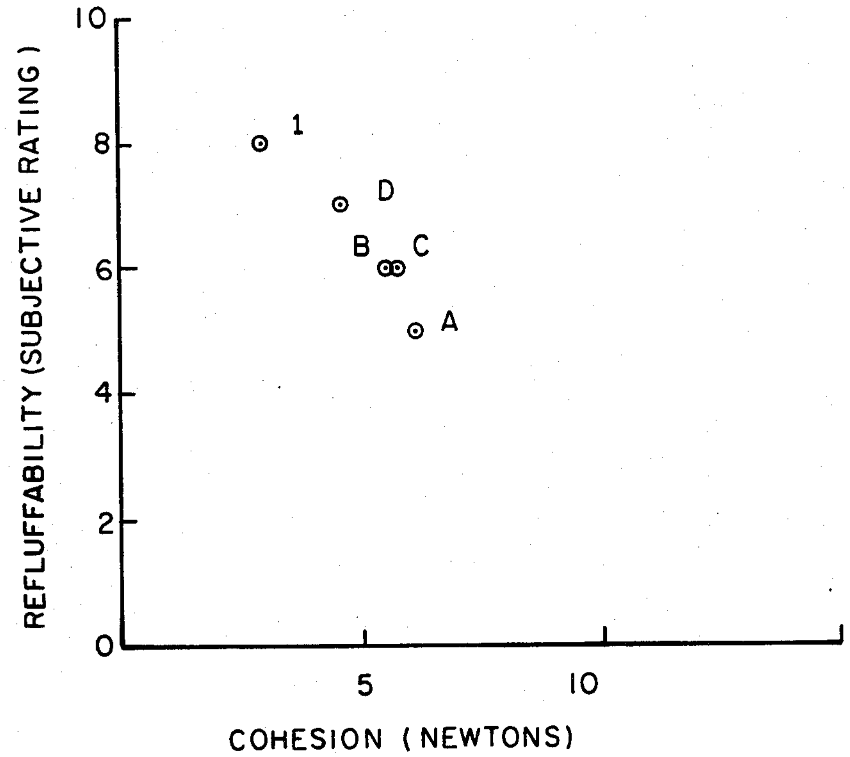
FIG. 7 is a graph plotting cohesion of some fiberfill products against refluffability of pillows containing such products.

The modified machine and its use are described with reference to FIGS. 5 and 6 of the accompanying Drawings. The main body is a horizontal stationary cylindrical drum 1 within which is a rotating axial shaft 2 that is driven by motor 3 and equipped with radial stirrer blades 4 that do not extend to the wall of the drum. The contents of the drum are recirculated by being withdrawn through outlets 16 and 18 at either end, along pipes 10 and being blown back into the drum through inlet 12 by blower 9. Before introducing the fiberfill starting material, the motor is started to drive the shaft and stirrer blades at a relatively low speed. Then blower 9 is started up to withdraw fiberfill from the supply source. When the drum has been charged with sufficient fiberfill, the feed of fiberfill is closed, and the fiberfill continues to recirculate. Optimum operation of the machine can be determined empirically, since this will depend on the condition of the starting fiberfill and on the product desired. If the starting fiberfill is already adequately separated into small discrete tufts that merely need reshaping and condensing, the shaft may be operated at a high rotational speed for sufficient time to achieve this purpose. If, however, the starting fiberfill is merely loose enough to be blown, and thus still needs separating into small discrete tufts, then the shaft should be operated a low rotational speed until the tufts are sufficiently small and separate. Progress can be viewed through glass sight windows conveniently located in the wall and end faces 15 and 17 of the drum.

There is an annular peripheral space between the extremities of the blades and the cylindrical wall. Because of the centrifugal force, most of the fiberfill is within the annular space, and it is desirable not to overfill the machine. The most important function of the stirrer blades is believed to be to stir the air, to create turbulence, and to turn the balls of fibers repeatedly so that they continually present different faces to the wall of the vessel, and thus produce rounded balls, rather than rolled cylinders (tails). Once a tail is formed during high speed operation, it is unlikely to be converted into a ball, but will present its cylindrical surface to the wall each time, and thus merely become a denser tail; this will raise the cohesion of the product, and so adversely affect refluffability.

As disclosed hereinafter the modified Lorch machine (or a commercial Lorch blender) may be used to intimately blend the fiberballs of the invention with other materials, if desired, e.g., natural products, such as down or feathers, other fibers or pieces of non-woven fabric to give lubricity, as is well-known in the art.

The invention is further described in the following Examples. All parts and percentages are by weight, and of the weight of fiber, unless otherwise stated.

EXAMPLE I

A tow of asymmetrically-jet-quenched drawn slickened poly(ethylene terephthalate) filaments of 4.7 dtex was prepared conventionally without mechanical crimping, using a draw ratio of 2.8×, a commercial polysiloxane slickener in amount 0.35% Si, and a relaxation temperature of 175° C. thus curing the silicone slickener on the filaments in the tow. The filaments were cut to 35 mm and relaxed again in staple form at 175° C. The staple was compressed to a density of 200 $kg/m^3$. This fiberfill was opened by using a Rotopic® opener (available from Rieter, Switzerland) and a batch was conveyed by air stream into the modified machine described and illustrated, and processed at 250 rpm for 1 minute first, to break the mass of fiber into small discrete tufts, and then for 3 minutes at 400 rpm, to convert those tufts into balls and then to consolidate these balls, i.e. to produce fiberballs, according to the invention, which were sprayed with 0.5% of a low temperature-curing silicone (Ultratex ESU) diluted with 4 parts of water to each part of silicone, to further reduce the cohesion of the fiberballs. Almost two thirds of the resulting product comprised round fiberballs. This product performed very well as a pillow filling with fully acceptable refluffability, durability and hand after stomping on the Fatigue Tester (described hereinafter), as can be seen from the comparison of some key characteristics in Table 1, where item 1, the sample of the invention, is compared with 4 commercially available products, as described. The first line indicates whether these fiberfill products are loose (items 3 and 4) or discrete shaped bodies (items 1, 2 and 5). The next line indicates for the shaped bodies whether the fiberfill products are predominantly round, as described hereinafter by this counting measurement, because such ball-shape is of importance with regard to refluffability. The next line indicates the cohesion value of the fiberfill product measured as described hereinafter. The last line indicates the refluffability of pillows containing each fiberfill by the subjective test described hereinafter, after stomping on the Fatigue Tester, on a scale of 1 to 10, anything less than 7 being unacceptable on a very strict basis, and on the same very strict basic, 7 being borderline, and 8 or more being acceptable, with 10 indicating that refluffability remains unchanged after undergoing stomping on the Fatigue Tester.

TABLE 1

| Samples | 1 | 2 | 3 | 4 | 5 |
|---|---|---|---|---|---|
| Fiberfill Product | | | | | |
| Description | Balls | Mixed | Loose | Loose | Cylinders |
| % Round | 65 | 28 | — | — | 0 |
| Cohesion (Newtons) | 3.0 | 7.2 | 15.3 | 20 | 19.3* |
| Pillows | | | | | |

TABLE 1-continued

| Samples | 1 | 2 | 3 | 4 | 5 |
|---|---|---|---|---|---|
| Refluffability | 8 | 4 | 4 | 2 | (6*) |

Sample Description
1. Sample of Invention, Example 1, predominantly balls, spiral-crimp, average dimensions 3-5 mm
2. Competitive offering (38 K), (blend of 9 and 2.7 dtex, also spiral-crimp) some discs mixed with more tails (Note that even the round bodies are flattened discs, not spherical).
3. Loose commercial Dacron ® fiberfill (6.1 dtex, 35 mm cut length, 4 hole hollow fiber, no spiral-crimp), that has given a notable improvement in aesthetics, especially softness, over prior loose fiberfill.
4. ESTEROLLA, loose competitive product sold by Toyobo (1.6 dtex, 40 mm cut length, no spiral-crimp)
5. ESLON III, competitive product of low dpf (2.7 dtex, 29 mm cut length, spiral-crimp), squeezed into compact cylinders of parallelized fibers of length 50-100 mm and width 2-4 mm.
*Note - this pillow was filled (as recommended by the manufacturer) with 20% more fiberfill than the others, so this result is not comparable with the others.

Comparison

When item 3 in Table 1, the commercial Dacron ® fiberfill without spiral-crimp, was treated on the same modified machine at 400 rpm for 5 minutes, the result was merely a loose mass of fiberfill, more than 95% opened, without any consolidation into shaped bodies. This demonstrates the need to use spirally-crimped starting material to obtain the fiberballs of the invention.

EXAMPLE II

This shows the effect of varying the conditions of treatment using the same spirally-crimped starting fiberfill as Example 1.

A—First, as a base point (comparison), the starting fiberfill was prepared in loose form without processing on the machine.

B—the starting fiberfill was processed for 8 minutes at 350 rpm to make fiberballs (only 40%).

C—the starting fiberfill was first opened on the Rotopic ® and then processed for 5 minutes at 700 rpm to make a larger proportion of fiberballs, but of similar cohesion value.

D—item C was sprayed with 0.5% of the same silicone as in Example 1 to reduce the cohesion value.

The same key characteristics as in Table 1 are compared for these products in Table 2. Refluffability is in each case superior to that of 38K (Item 2 in Table 1). It can be seen from the results of C and D that the cohesion is significantly reduced by application of silicone, and that the refluffability is thereby improved to borderline acceptability, but is inferior in refluffability to Example 1.

TABLE 2

| Samples | A | B | C | D | 1 |
|---|---|---|---|---|---|
| Fiberfill Product | | | | | |
| % Balls | 0 | 40 | 68 | 68 | 65 |
| Cohesion (Newtons) | (6.1) | 5.8 | 5.7 | 4.7 | 3.0 |
| Pillows | | | | | |
| Refluffability | 5 | 6 | 6 | 7 | 8 |

To avoid any doubt it should be emphasized that Item 1, the product of Example 1, is a preferred product because of its significantly better refluffable characteristic, which is believed to be the result of the low cohesion value (3.0), and which makes these fiberballs excellent filling material for use in pillows, where almost down-like refluffability is desirable, especially in certain markets in Europe and the U.S.A. Items B, C and especially D are also, however, new products with improved refluffability, and are expected to find utility in other markets, e.g. where excellence in refluffability is not of such prime importance, and because of other advantages, such as air transportability, since the cohesion values (less than 6, preferably about 4.5 or less) are still lower and their refluffability is also better than for most prior art shaped bodies such as 38K.

Although the refluffability is judged subjectively, and although it may be difficult sometimes to rank pillows that do not have satisfactory refluffability, it is interesting to note the correlation between the refluffability rankings and the cohesion values of these 5 products, as shown in FIG. 1. Such a correlation does not, however, always exist with widely differing materials, as can be seen from Table 1.

EXAMPLE III

A tow of asymmetrically-jet-quenched drawn slickened poly(ethylene terephthalate) filaments of 4.7 dtex was prepared essentially as in Example 1, using a draw ratio of 2.8× and a well-distributed commercial polysiloxane slickener, 0.35% Si, except that the curing and relaxation temperature for the tow was 130° C. The filaments were cut to 35 mm, and relaxed again at 175° C. The product was compressed to a density of 200 kg/m$^3$. A batch of the compacted material was opened on a conventional opener (Rotopic ®, Rieter, Switzerland) to open the fibers and separate them into discrete tufts. The opened material was conveyed by air stream to the modified machine described and illustrated, and processed first at 250 rpm for 1 minute, followed by 3 minutes at 400 rpm to produce and consolidate the fiberballs of the invention.

This product had excellent durability, and even better refluffability than the product of Example 1, as shown in Table 3:

TABLE 3

| Example No. | I | III |
|---|---|---|
| Fiberfill product | | |
| % Round | 65 | 75 |
| Cohesion (Newtons) | 3.0 | 2.0 |
| Pillows | | |
| Refluffability | 8 | 9 |

The improvement in the refluffability and reduction in cohesion are believed to be partly the result of improving the lubricity of the fiberfill, by better distribution of the silicone, and, more importantly, of allowing more crimp to develop because the silicone was cured as the tow was relaxed at a lower temperature (only 130° C.), and then a significantly higher relaxation temperature (175° C.) was used *after* the filaments were cut to staple fibers, which were able to crimp more freely than the filaments of the tow in Example 1.

The durability of the pillow was also studied, before and after undergoing stomping on the Fatigue Tester, and the results are shown in Table 4:

TABLE 4

| | IH | 60 N | 200 N | Softness Absolute | Softness Relative |
|---|---|---|---|---|---|
| Before | 15.6 | 8.0 | 4.4 | 7.6 | 49 |
| After | 13.2 | 7.2 | 4.3 | 6 | 45 |
| Δ% | −15.4 | −10.0 | −2.3 | −21 | −8 |

EXAMPLE IV

This shows that the fiberballs of the invention can give good results when intimately blended with natural products or other materials in the same modified machine at 350 rpm for 1 minute.

(1) A blend of 75/21.25/3.75 of Example 1/duck feather/down, made with 75% of the product of Example 1 and 25% of a blend of 85/15 duck feathers/down gave an excellent pillow with a refluffability rating of 9.

(2) A blend of 7 parts of the product of Example 1 and 1 part of an unbonded fluffy non-woven polyester of 40 g/m$^2$ chopped to 2.5×5 cm portions also gave an excellent pillow of equivalent refluffability to that of Example 1 and a bulk similar to that of blend (1).

Because natural products, especially feathers, are recognizably different, and some customers expect to feel feathers in articles, such as pillows, it may be advantageous to mix such natural products in any proportions desired with fiberballs, especially until customers become accustomed to the advantages of using fiberballs, although such mixtures will not be washable to the same extent as articles containing 100% fiberballs. The problem of washability is overcome by using, instead of feathers, staple fibers of significantly higher denier, higher than 10. Suitable pieces of non woven fabrics increase the lubricity of the blends with fiberballs, so it can be advantageous to use 5-30% by weight of such light weight pieces of non-woven fabrics, as has been disclosed for other filling materials.

DESCRIPTION OF TEST METHODS USED

Refluffability

What is needed is an evaluation of how a pillow, or other article, will perform in actual use. After prolonged use, a pillow may be examined to determine the extent to which it has retained its original softness (this is measurable quantitatively) and, importantly, whether the pillow is uniformly soft, or has harder lumps, which cannot be removed by simple shaking, and/or patting. No quantitative test has yet been devised for the latter quality, but this can be readily determined subjectively. It is especially possible to compare two pillows with widely differing refluffable characteristics. For comparison purposes herein, pillows were marked on a scale of up to 10, which maximum value would indicate that the refluffability remained unchanged from its original condition, i.e. more or less than down. It should be repeated that what has been considered unacceptable, or borderline on this very strict basis, may be an improvement over the prior art, as discussed for Items B, C and especially D in Example II.

To simulate prolonged normal use, a Fatigue Tester has been designed to alternately compress and release a pillow through about 10,000 cycles over a period of about 18 hours, using a series of overlapping shearing movements followed by fast compressions designed to provoke the lumping, matting and fiber interlocking that normally occurs during prolonged use with fiberfill. The amount of fiberfill in the pillow could greatly affect the results, so each pillow (80×80 cm) was blow-filled with 1000 g of filling material, unless otherwise stated (with special reference to item 5, ESLON III).

Durability

It is important that the pillow also retain its ability to recover its original shape and volume (height) during normal use, otherwise the softness will decrease significantly during use. So bulk losses were measured, in conventional manner, on the pillows both before and after undergoing stomping on the Fatigue Tester, mentioned above. These are mostly reported qualitatively herein, since the amount of softness is a matter of personal and/or traditional preference, and can be designed into the article such as a pillow by its manufacturer. What is important is whether the filling material has durability. Bulk measurements were made on an Instron ® machine to measure the compression forces and the height of the pillow, which was compressed with a foot of diameter 288 mm attached to the Instron. From the Instron plot are noted (in cm) the Initial Height (IH) of the test material, the Support Bulk (the height under a compression of 60N) and the height under a compression of 200N. The softness is considered both in absolute terms (Support bulk—IH), and in relative terms (as a percentage of IH). Both are important, and whether these values are retained after stomping on the Fatigue Tester.

Cohesion Measurement

This test was designed to test the ability of the fiberfill to allow a body to pass therethrough, and this does seem to correlate somewhat with refluffability in the case of fiberfill having a spiral-crimp and of the same dimensions, especially of the fiberballs. In essence, the cohesion is the force needed to pull a vertical rectangle of metal rods up through the fiberfill which is retained by 6 stationary metal rods closely spaced in pairs on either side of the plane of the rectangle. All the metal rods are of 4 mm diameter, and of stainless steel. The rectangle is made of rods of length 430 mm (vertical) and 160 mm (horizontal). The rectangle is attached to an Instron and the lowest rod of the rectangle is suspended about 3 mm above the bottom of a plastic transparent cylinder of diameter 180 mm. (The stationary rods will later be introduced through holes in the wall of the cylinder and positioned 20 mm apart in pairs on either side of the rectangle). Before inserting these rods, however, 50 g of the fiberfill is placed in the cylinder, and the zero line of the Instron is adjusted to compensate for the weight of the rectangle and of the fiberfill. The fiberfill is compressed under a weight of 402 g for 2 minutes. The 6 (stationary) rods are then introduced horizontally in pairs, as mentioned, 3 rods on either side of the rectangle one pair above the other, at vertical separations of 20 mm. The weight is then removed. Finally, the rectangle is pulled up through the fiberfill between the three pairs of stationary rods, as the Instron measures the build-up of the force in Newtons. The cohesion is believed to be a good measure of refluffability of comparable fiberballs from fiberfill of spiral-crimp, as described in Examples I to III, but may need modification according to the dimensions of the product desired.

% Round

As indicated, tails, i.e. condensed cylinders of fiberfill are not desirable since they decrease the refluffability (and increase the cohesion value) of what would otherwise be fiberballs of the invention, so the following method has been devised to determined the proportions of round and elongated bodies. About 1 g (a handful) of the fiberfill is extracted for visual examination, and separated into three piles, those obviously round, those obviously elongated, and those borderline cases which are measured individually. All those having a length to width ratio in cross-section of less than 2:1 are counted as round.

The dimensions of the fiberballs and denier of the fibers are important for aesthetic reasons, but it will be understood that aesthetic preferences can and do change in the course of time. The cut lengths are preferred for making the desired fiberballs by low hairiness. As has been suggested in the art, a mixture of fiber deniers may be desired for aesthetic reasons.

As indicated, polyester fiberfill has generally been packed and transported in compressed bales, which means that the fiberfill must be opened and loosened before it can be used in most processes. In contrast, down is generally packed and transported more loosely in bags that are not compressed to any degree comparable to the bales. When the down is put into, e.g., a pillow, it is generally blown (or sucked) out of the bag and fed directly into the pillow. Advantageously, the fiberballs of the invention may also be packed and transported loosely in bags, i.e., in similar manner to down, such that they can be removed by suction in similar manner to down. The fact that the fiberballs of the invention may be conveyed and packed in pillows easily by blowing can be a major advantage to the pillow manufacturer, and can reduce the cost of his handling the fiberfill, as contrasted with conventional baled fiberfill, assuming he has equipment for blowing down or similar material. This reduction in cost of subsequent handling can offset, at least partially, the extra cost to such manufacturer resulting from processing fiberfill into fiberballs of the invention and in transporting these fiberballs.

Alternatively, the fiberballs of the invention may be compressed under moderate pressures, e.g., 75 or 100 $Kg/m^3$, which are much less than those used hitherto for loose fiberfill, since compacted fiberfill will be less expensive to transport than loose bags, such as have been used for down. Indeed, after compressing fiberballs of the invention for 1 week at 80 $Kg/m^3$, the fiberballs could still be blown (or sucked) using commercial equipment, this being a further demonstration of the low cohesion (lack of hairiness) that enables the fiberballs to be handled in this manner. It is possible that the fiberballs of the invention may be compacted under still higher pressures, and still perform adequately, in the sense of being air-transportable, and refluffable.

I claim:

1. Refluffable fiberballs of average dimension 1 15 mm, consisting essentially of randomly-arranged, entangled, spirally-crimped polyester fiberfill having a cut length of about 10 to about 60 mm, and having a cohesion measurement as defined of less than 6 Newtons (N).

2. Fiberballs according to claim 1, wherein the cohesion measurement is about 4.5N or less.

3. Fiberballs according to claim 1, wherein at least 50% by weight of the balls have a cross-section such that its maximum dimension is not more than twice its minimum dimension.

4. Fiberballs according to claim 1, wherein the fiberfill is coated with a silicone slickener in amount 0.15 to 0.5% Si by weight of the fiberfill.

5. Fiberballs according to claim 4, wherein the amount of silicone is 0.3 to 0.4% Si by weight of the fiberfill.

6. Fiberballs according to claim 1, wherein the fiberfill is of denier 1 to 10.

7. Blends of fiberballs according to claim 6, intimately blended with staple fibers of denier significantly higher than 10.

8. Blends of fiberballs according to claim 1, intimately blended with pieces of light-weight non-woven fabrics in amount 5 to 30% by weight of the blend.

9. Blends of fiberballs according to claim 1, intimately blended with down and/or feathers.

10. Fiberballs according to claim 1, packed into bags like down, so that the fiberballs may be removed and transported by suction.

11. Fiberballs according to claim 1, compressed into packages of density up to about 100 $Kg/m^3$, and such that the fiberballs may be removed and transported by suction.

12. Process for making polyester fiberfill having refluffable characteristics, wherein small tufts of polyester fiberfill having spiral-crimp are repeatedly tumbled by air against the wall of a vessel to provide an assembly of fiberballs having a cohesion value as defined of less than 6N.

13. Process according to claim 12, wherein the tufts are tumbled against a cylindrical wall of a vessel by air stirred by blades attached to a shaft rotating axially in the vessel.

14. Process according to claim 13, wherein the small tufts and the air are recirculated through the vessel.

15. Process according to claim 12, wherein the tufts are formed by feeding loose fiberfill into the vessel, and rotating the shaft and blades at a speed such that the fiberfill is separated into the small tufts.

16. Process according to claim 12, wherein small tufts that are not elongated are formed before feeding them into the vessel for rounding and condensing by air-tumbling.

17. Process according to claim 12, wherein the tufts formed in the vessel are treated with a polysiloxane slickener, and the cohesion value is reduced to about 3N or less.

18. Process according to claim 12, wherein the cohesion value of the assembly is about 4.5N or less.

* * * * *

UNITED STATES PATENT OFFICE

CERTIFICATE OF CORRECTION

PATENT NO. : 4,618,531

DATED : October 21, 1986

INVENTOR(S) : Ilan Marcus

It is certified that error appears in the above-identified patent and that said Letters Patent are hereby corrected as shown below:

Column 11, line 56, --to-- should be inserted between "1" and "15".

Signed and Sealed this

Sixth Day of January, 1987

*Attest:*

DONALD J. QUIGG

*Attesting Officer*

*Commissioner of Patents and Trademarks*